United States Patent [19]

Walles

[11] Patent Number: 5,636,310
[45] Date of Patent: Jun. 3, 1997

[54] FIBER OPTIC CABLE ADAPTER FOR ATTACHING A FIBER TO A FIBER OPTIC CONNECTOR

[75] Inventor: Gerard G. Walles, Sandy Hook, Conn.

[73] Assignee: Sikorsky Aircraft Corporation, Stratford, Conn.

[21] Appl. No.: 551,639

[22] Filed: Nov. 1, 1995

[51] Int. Cl.[6] .................................................... G02B 6/00
[52] U.S. Cl. .................................................... 385/139
[58] Field of Search ........................... 385/53, 55, 56, 385/58, 60, 76, 77, 78, 62, 81, 136–139

[56] References Cited

U.S. PATENT DOCUMENTS

| | | | |
|---|---|---|---|
| 4,190,316 | 2/1980 | Malsby et al. | 350/96.18 |
| 4,279,467 | 7/1981 | Borsuk et al. | 350/96.21 |
| 4,291,941 | 9/1981 | Melzer | 350/96.18 |
| 4,597,632 | 7/1986 | Mallinson | 350/96.21 |
| 4,712,860 | 12/1987 | Corrales | 350/96.2 |
| 4,718,746 | 1/1988 | Chrepta | 350/96.21 |
| 4,929,046 | 5/1990 | Barlow | 350/96.21 |
| 4,938,558 | 7/1990 | Miller et al. | 350/96.2 |
| 5,048,916 | 9/1991 | Caron | 385/71 |
| 5,129,023 | 7/1992 | Anderson et al. | 385/70 |
| 5,222,169 | 6/1993 | Chang et al. | 385/87 |
| 5,371,819 | 12/1994 | Szegda | 385/139 X |
| 5,444,810 | 8/1995 | Szegda | 385/139 |
| 5,448,676 | 9/1995 | White et al. | 385/84 |
| 5,515,466 | 5/1996 | Lee | 385/139 X |

*Primary Examiner*—Akm E. Ullah
*Attorney, Agent, or Firm*—Seidel Gonda Lavorgna & Monaco, PC

[57] ABSTRACT

An adapter for connecting a terminus of an optical fiber to a passage within a fiber optic cable connector. The terminus includes an optical fiber surrounded by a ferrule. The ferrule is mounted within a plug member which has a shoulder portion. The adapter includes a housing with a chamber formed therein which is adapted to receive the terminus of the fiber. The adapter also includes means for removably attaching the fiber to the housing. In one embodiment the means for removably attaching the fiber is a cap with has a channel formed through it. The cap retains the terminus of the fiber within the chamber. A plug extension is formed on the housing with at least a portion of the plug extension being adapted to fit within the passage in the fiber optic connector for removably engaging the adapter to the fiber optic connector. The plug extension includes a shaft and a shoulder. The shoulder is adapted to contact a seat within the fiber optic connector for limiting axial translation of the adapter within the passage. When attached to the fiber optic connector, the adapter functions to space the terminus of the fiber away from the fiber optic connector and, thus, prevents contact between termini of non-active fibers in a fiber optic cable system.

18 Claims, 5 Drawing Sheets

FIBER OPTIC CABLE ADAPTER FOR ATTACHING A FIBER TO A FIBER OPTIC CONNECTOR

FIELD OF THE INVENTION

The present invention relates to fiber optic cables and, more particularly, to a terminus adapter for attaching a reserve optical fiber to a fiber optic connector.

BACKGROUND OF THE INVENTION

Fiber optic cabling is used extensively in data communications. One reason for this is that optical fibers have higher data carrying capability as compared to conventional insulated copper wire conductors.

One problem associated with fiber optic cabling is the difficulty associated with repair and replacement of damaged cables. If even a single fiber is damaged, a considerable amount of data can be lost. Techniques have been developed over the years in an attempt to provide for ease of maintenance and repair. Typically these techniques have been directed to splicing damaged fibers, in which the damaged section of fiber and ferrule are cut away and replaced with a new fiber and ferrule section. U.S. Pat. No. 5,201,019 discloses one such type of fiber splice. The new section of fiber must be accurately aligned and spaced with respect to the existing section in order to prevent or minimize transmission losses. As a result, the splicing of a damaged fiber is an extremely difficult and time consuming operation.

An alternate method for repairing a cable is by replacing the entire length of damaged fiber. However, the location and routing of the fiber through the structure in which it is retained may make replacing the fiber a non-viable option. For example, in an aircraft which utilizes fiber optic cabling for transmitting data, such as the RAH-66 Comanche aircraft, the fiber optic cabling extends along numerous curved conduits and ducts. Replacement of a cable would require disconnecting both ends of the fiber and pulling the fiber out of the conduits. A new cable would then have to be inserted into and snaked through the conduits. Curves in the conduits may hamper or prevent the cable from being completely inserted. Hence, it is often difficult and sometimes impossible to route a new fiber in a preexisting conduit.

In these circumstances, the fiber optic cable is sometimes designed to have redundant or "dummy" fibers. That is, the cable includes additional fibers which are not needed but, instead, function as reserve fibers in case one or more primary fibers fail. The dummy fibers are routed through the entire system with the "active" fibers. Both the active and dummy fibers are plugged into cable connectors. The dummy fibers, however, are plugged into non-active passages of the connector. An example of this type of connector is shown in FIG. 1 wherein the active fibers are designated 'A' and the dummy fibers are designated 'D'. Repair of a damaged cable simply requires the substitution of the dummy fiber into the active passage originally occupied by the damaged fiber or, alternately, activating the entire dummy fiber.

The primary drawback to a fiber optic cable system with dummy fibers is that the termini of the dummy fibers, even though not conducting data, are still in constant contact with one another. Contact between the termini ends of the dummy fibers can produce wear and fiber degradation just as in active fibers, resulting in transmission losses through the fiber when the dummy fibers are activated.

A need therefore exists for a simple and inexpensive system for preventing damage to termini of the dummy fibers in a fiber optic cable before they are activated.

SUMMARY OF THE INVENTION

An adapter for connecting a terminus of an optical fiber to a passage within a fiber optic cable connector. The terminus includes an optical fiber surrounded by a ferrule. The ferrule is mounted within a plug member which has a shoulder portion. The adapter comprises a housing with a chamber formed therein which is adapted to receive the terminus of the fiber. The adapter includes means for removably attaching the fiber to the housing. In one embodiment the means for removably attaching the fiber is a cap which has a channel formed through it for receiving a portion of the fiber. The cap operates to retain the terminus of the fiber within the chamber.

A plug extension is formed on the housing. At least a portion of the plug extension is adapted to fit within the passage in the fiber optic connector for removably attaching the adapter to the fiber optic connector. The plug extension includes a shaft and a shoulder. The shoulder is adapted to contact a seat within the fiber optic connector for limiting axial translation of the adapter within the passage.

When attached to the fiber optic connector, the adapter functions to space the terminus of the fiber away from the fiber optic connector and, thus, prevents contact between termini. Accordingly, when utilized with non-active fibers in a fiber optic cable system, the present invention protects the termini of the non-active fibers from damage.

The foregoing and other features and advantages of the present invention will become more apparent in light of the following detailed description of the preferred embodiments thereof, as illustrated in the accompanying figures.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

DETAILED DESCRIPTION OF THE PREFERRED EMBODIMENTS

Figure 2:
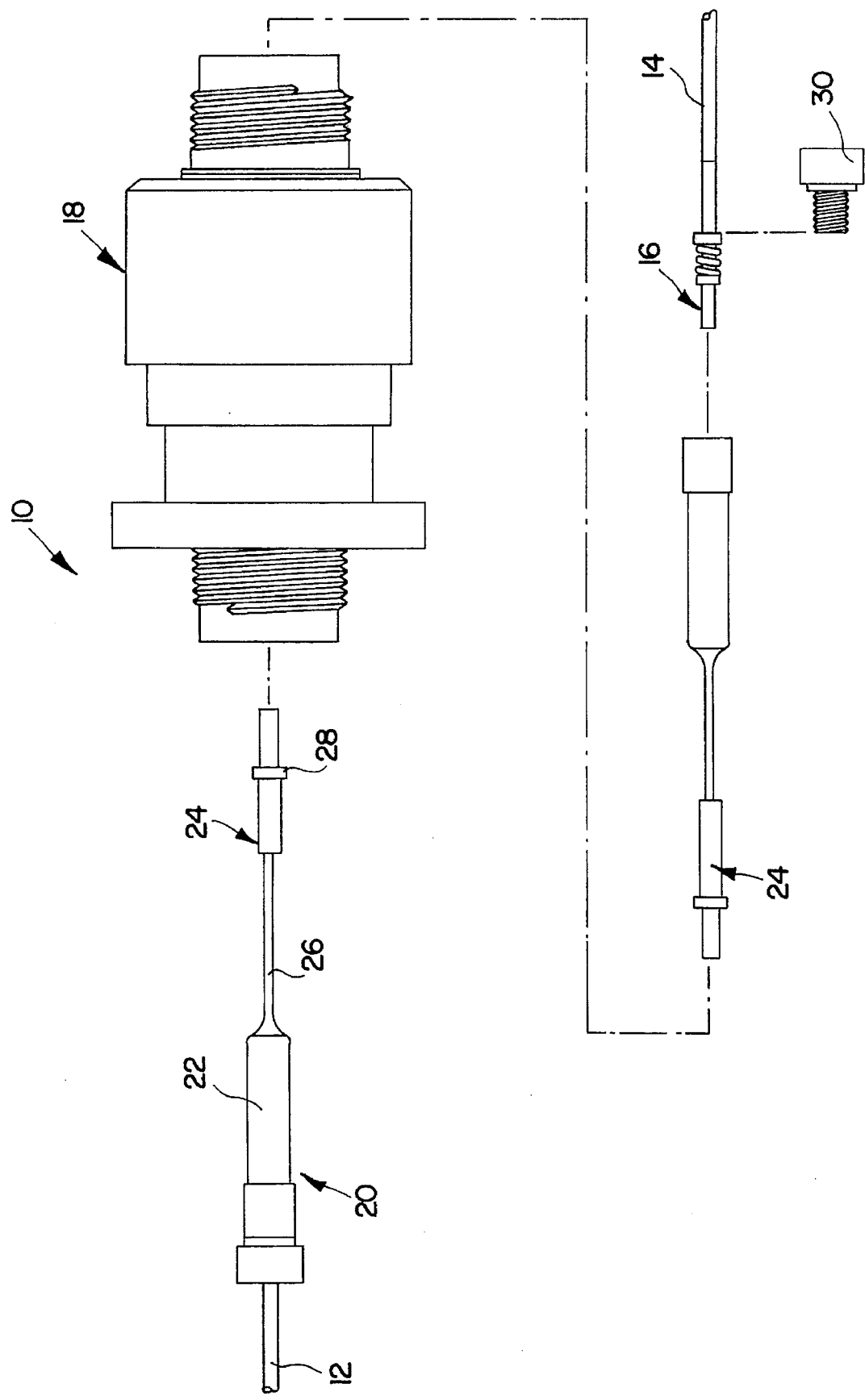
FIG. 2 is an exploded view of a fiber optic adapter according to the present invention utilized for connecting the terminus of an optical fiber to the cable connector.

Referring now to the drawings, wherein like numerals identify corresponding or similar elements throughout the several views, there is shown in FIG. 2 an embodiment of the present invention as it is incorporated in a fiber optic cable system 10. The fiber optic cable system 10 includes two or more fiber optic cables connected together through a connector. The individual fibers 12 of the first cable communicate with corresponding fibers 14 of the second cable through passages in the fiber optic connector 18. In the illustrated embodiment, only one set of first and second fibers 12, 14 is shown for simplicity. However, it should be apparent that a fiber optic cable system may include multiple sets of fibers, some of which may be reserve or "dummy" fibers. Although each of the fibers has a terminus in the connector, only one terminus 16 is shown in FIG. 2.

A fiber optic adapter 20 is located between the terminus of at least one of the fibers 12, 14 and the fiber optic connector 18. In the illustrated embodiment, two adapters 20 are utilized, one on each fiber 12, 14. The adapter 20 comprises a housing 22 and a plug extension 24. The housing 22 is substantially cylindrical in shape with an opening at one end. The plug extension 24 includes a shaft 26 and a shoulder 28 formed around at least a portion of the periphery of the shaft 26. As will be discussed in more detail below, the fiber is attached to the adapter by a cap 30.

Figure 3:
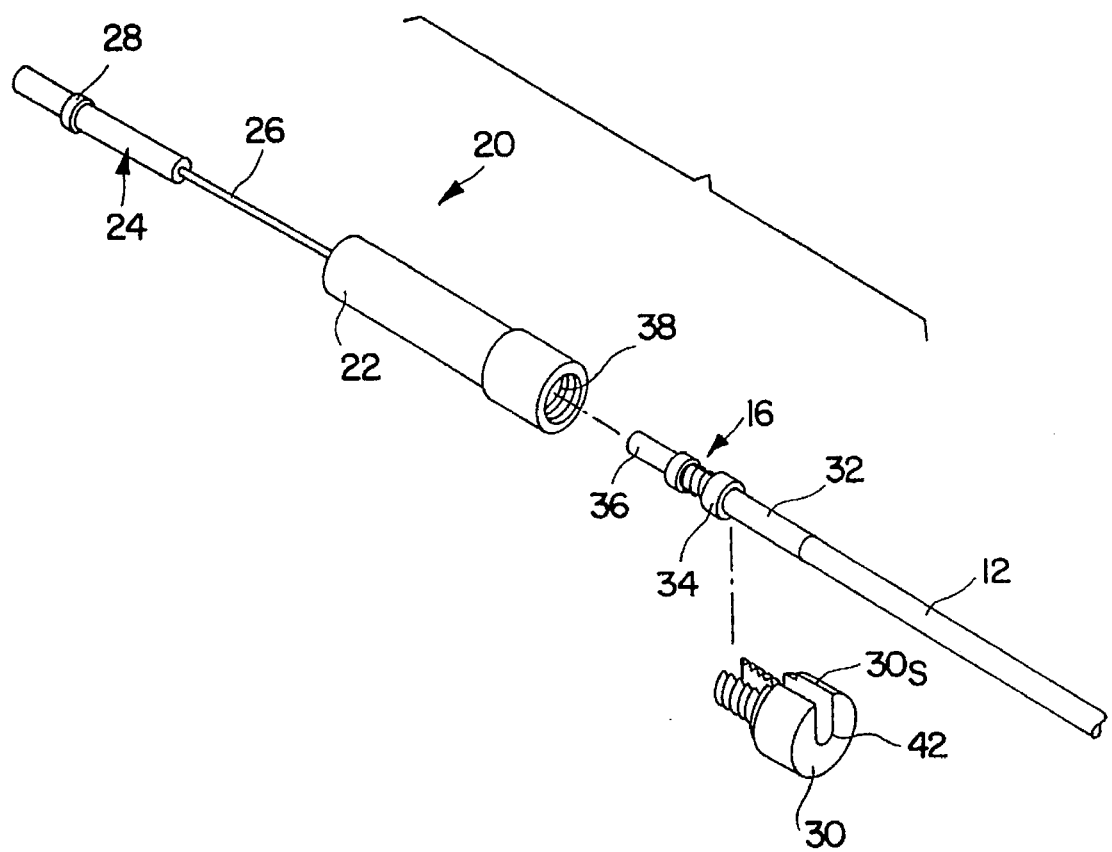
FIG. 3 is an exploded view of the fiber optic adapter.

FIG. 3 is an isometric view of the fiber optic adapter 20 prior to attachment of the fiber 12. The terminus 16 of the fiber 12 typically includes a plug member 32, with a shoulder 34 formed around its periphery. The terminus 16 also includes a ferrule 36 which projects past the shoulder. The ferrule 36 surrounds an optical fiber (not shown) which extends through the plug and ends essentially flush with the face of the ferrule. This is conventionally known as a pin-type ferrule. The ferrule 36 may also include an alignment sleeve (not shown), in which case it is known as a socket-type ferrule. The fiber 12 is illustrated in FIG. 3 in position for insertion into a chamber 38 in the housing 22 of the adapter.

Figure 4:
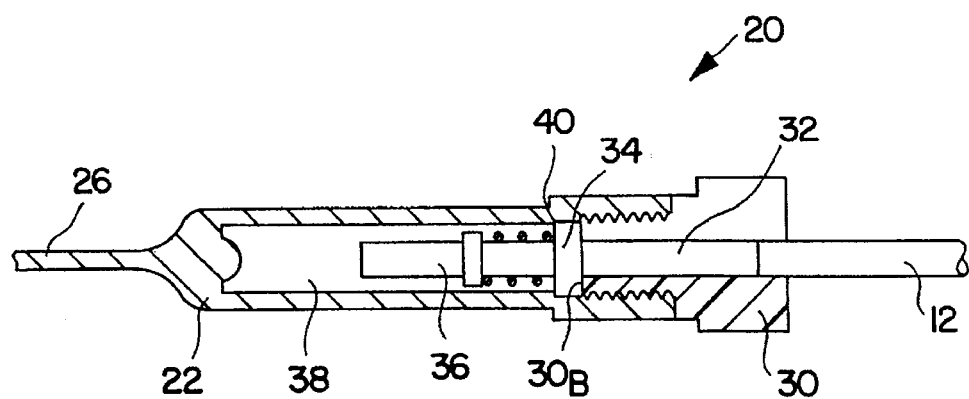
FIG. 4 is a sectional view of a portion of the fiber optic adapter showing a fiber attached to an adapter housing.

Referring now to FIG. 4, a partial section view of the adapter 20 illustrates the chamber 38 in more detail. The chamber 38 is configured to accept the ferrule 36. The size of the ferrule will normally determine the chamber size (e.g., length, diameter, etc.). Military Specification MIL-T29504/4A specifies approved standard ferrule and termini dimensions for military uses. A standard diameter for a pin-type ferrule is approximately 0.0625 inches. A standard diameter for a socket-type ferrule is approximately 0.117 inches. A standard diameter for the shoulder portion of the plug member is approximately 0.130 inches. The chamber 38 is preferably configured to accept both the pin and socket-type ferrules.

A step 40 is formed around at least a portion of the periphery of the chamber 38. The step is preferably sized slightly smaller in diameter than the shoulder portion 34 of the plug member 22 (e.g., less than 0.130 inches) so as to limit the axial travel of the fiber terminus 16 into the chamber 38. Hence, when the fiber 12 is completely inserted into the housing 22, the shoulder portion 34 seats against the step 40, thereby locating the ferrule 36 within the chamber 38.

The length of the chamber 38 depends on the length of the ferrule 36 projecting past the shoulder portion 34. This length can vary anywhere from about 0.25 inches to over an inch. It is preferable that the chamber 38 be designed to accommodate a wide range of ferrule lengths.

The cap 30 attaches the fiber 12 to the housing 22 to prevent the terminus 16 from sliding out of the chamber 38. More particularly, a base 30B of the cap 30 contacts the shoulder portion 34 of the plug member 32 urging it against the step 40 of the housing 22. Thus, the cap 30 functions to retain the terminus 16 within the housing 22.

As shown in FIG. 3, the cap 30 has a channel 42 formed through it for receiving a portion of the fiber 12. In a preferred embodiment, the channel 42 extends to the lateral side 30S of the cap 30 forming a slot for permitting the fiber 12 to be slid into and out of the channel 42. The cap 30 preferably includes external threads with mate with corresponding internal threads formed on a portion of the housing 22. Alternately, the threads on the cap 30 can be internal threads which mate with corresponding external threads formed on the housing 22. Other attachment mechanisms can be substituted for threads without detracting from the invention. For example, the cap could be press-fit into engagement with the housing 22. A key and latch arrangement can also be utilized.

Figure 7:
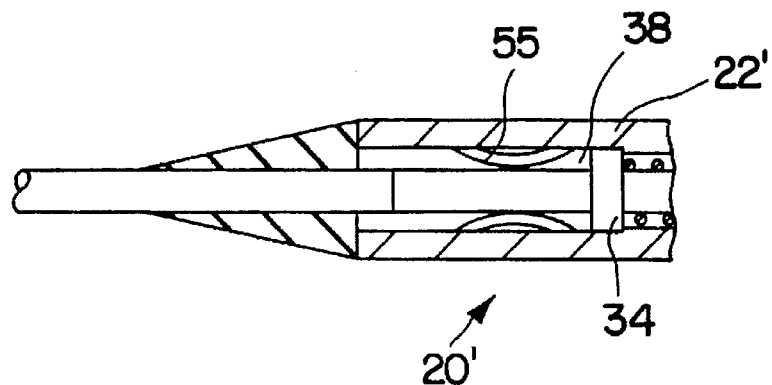
FIG. 7 is a sectional view of a portion of the fiber optic adapter according to the present invention.

Another embodiment of the adapter 20' is shown in FIG. 7, the cap is replaced by a locking mechanism formed in the housing 22'. As illustrated, a spring locking clip 55 is included in the chamber 38 and reciprocates within the housing 22' between a normal and deflected position. In the normal position, the spring clip 55 prevents the shoulder portion 34 of fiber 12 from exiting out of the housing 22'. When the spring clip 55 is in its deflected position, the shoulder portion 34 can readily pass into and out of the housing 2'. A standard fiber optic removal or extraction tool can be used to facilitate insertion and removal of the termini 16 from the holder 20' by moving it past the clip 55.

Figure 8:
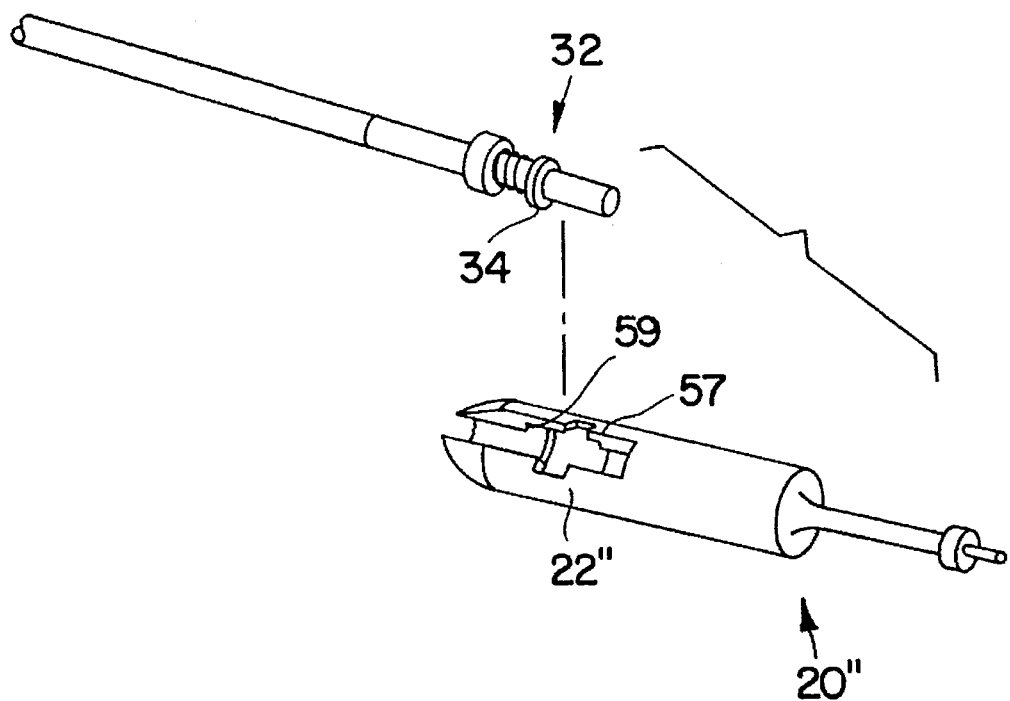
FIG. 8 is an exploded view of another fiber optic adapter embodiment according to the present invention.
Figure 9:
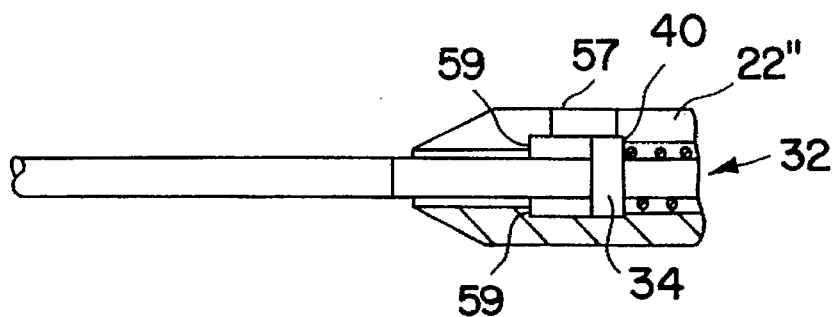
FIG. 9 is a sectional view of a portion of the adapter of FIG. 8.

Another embodiment (designated by numeral 20") is shown in FIGS. 8 and 9. The housing 22" has a slot 57 along its side permitting the terminus 16 of the fiber 12 to be slid laterally into the chamber 38. In this embodiment, a retention flange 59 is formed near the end of the housing 22 and comprises a necked-down or stepped portion of the housing 22" which prevents the terminus 16 from being pulled axially out of the housing 22". Accordingly, when the terminus 16 of the fiber 12 is placed within the chamber 38, the step 40 and the retention flange 59 function to limit the axial movement of the terminus 16 within the housing 22". A closure clip or similar type device (not shown) can be attached over the slot 57 after the terminus 16 has been placed in the chamber 38 to prevent the terminus 16 from laterally sliding out. Those skilled in the art would readily understand and appreciate the diverse attachment/retention mechanisms that can be practiced within the purview of the claims.

The plug extension 24 extends outward from the housing 22. The plug extension 24 may be formed apart from the housing 22 and then attached to it in a subsequent process. However, it is preferable that at least the shaft 26 of the plug extension 24 is formed as an integral extension of the housing 22 as shown in FIGS. 3 and 4. The shoulder 28 is formed near a distal end of the plug extension 24 and has a diameter which is preferably substantially the same as the diameter of the shoulder portion 34 of the plug member 32. This permits the shoulder 28 of the plug extension 24 to fit within the fiber optic connector 18 in the place of the shoulder portion 34 of the plug member 32. The shaft 26 functions as a means for spacing the housing 22 from the shoulder 28.

The attachment of the plug extension 24 to the fiber optic connector 18 is discussed in more detail with reference to FIGS. 2 and 5. The fiber optic connector 18 includes male and female connector components 42, 44. Fiber optic connectors are well known in the art and, hence, only those elements of the connector required for a clear understanding of the invention will be discussed. Each connector component includes a grommet 46, typically made from rubber. The grommet 46 has one or more apertures 28 formed therethrough which are adapted to accept a terminus of a fiber. One or more conduits 50 are formed within the fiber optic connector 18. Each conduit 50 is substantially aligned with a corresponding aperture 48 in each grommet 46. Accordingly, the combination of grommets 48 and conduits 50 form one or more passages through the fiber optic connector 18. A seat 52 is formed around a peripheral edge of the conduits 50 at two locations within the fiber optic connector 18.

The shoulder portion 34 of each plug member 32 is designed to rest on the seat 52 when an active fiber is inserted into the fiber optic connector 18 in its normal manner. However, when the fiber optic adapter 20 according to the present invention is utilized to attach a non-active or dummy fiber to the fiber optic connector 18, the shoulder 28 of the plug extension 24 rests against the seat 52 when the fiber optic adapter 20 is engaged with the fiber optic connector 18. In this position, the shaft 26 of the fiber optic adapter 20 extends through the aperture 48 in one of the grommets 46 and positions the housing 22 of the fiber optic adapter 20 external to the fiber optic connector 18. Thus, when the terminus 16 of the fiber 12 is mounted within the chamber 38 of the adapter 20 and the adapter 20 is connected to the fiber optic connector 18, the fiber terminus 16 is spaced apart from the fiber optic connector 18.

The plug extension 24 of the adapter 20 may also include a tip 54 which is substantially the same size as the ferrule 36 on the fiber 12. The tip 54 slides within the passages in place of the ferrule 36.

Figure 5:
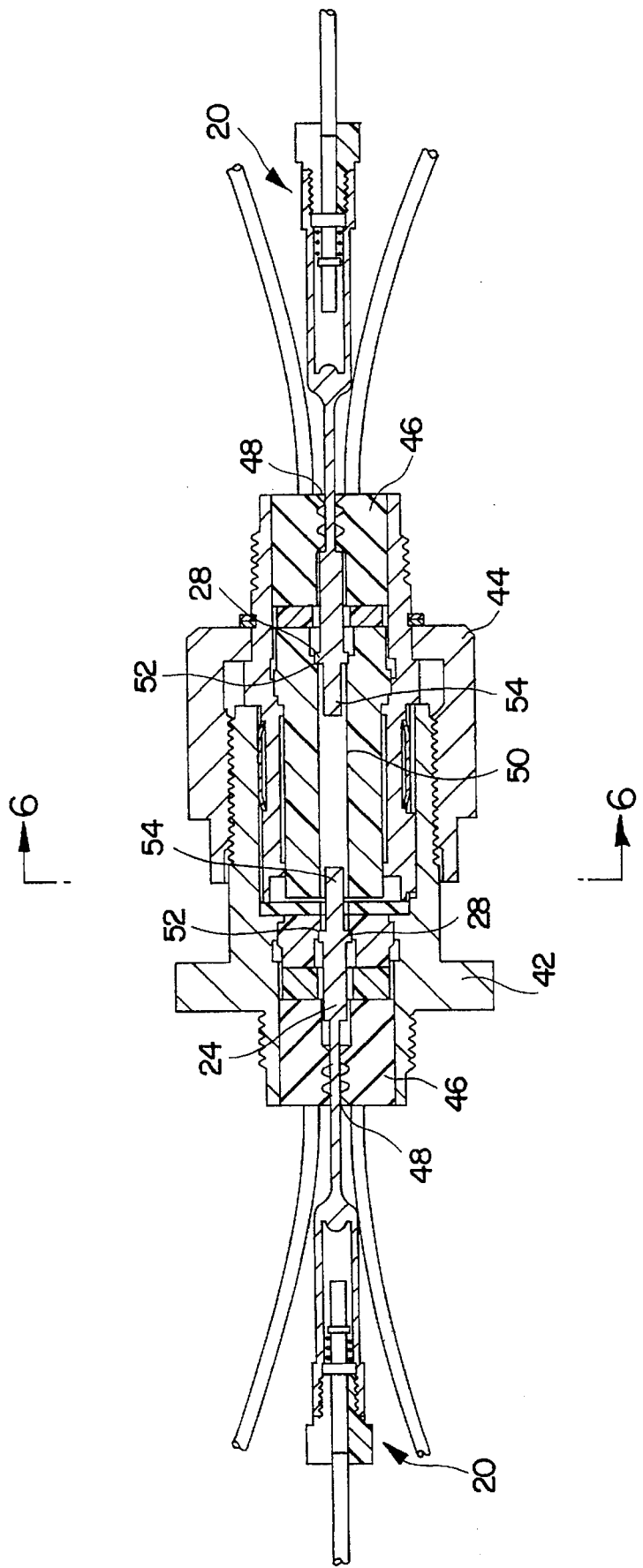
FIG. 5 is a sectional view of a fiber optic connector with two fiber optic adapters attached thereto.

The embodiment of the invention illustrated in FIG. 5 shows two fiber optic adapters 20, each having an associated dummy fiber disposed within it. It is also contemplated, however, that only one fiber optic adapter 20 may be utilized. In this alternate embodiment, one of the dummy fibers is connected directly to the fiber optic connector 18 in its normal manner. The second fiber is connected to the fiber optic adapter 20 which, in turn, is attached to the fiber optic connector 18 as discussed above. This alternate configuration provides the needed spacing between fiber termini to prevent damage due to contact.

The fiber optic adapter 20 can be made from any suitable material, such as plastic. The cap 30 may also be made from plastic material or, alternately, could be made from a metallic material such as aluminum. The diameter of the shaft 26 is preferably chosen to provide a small degree of flexibility for the fiber optic adapter 20. Hence, if the adapter 20 is inadvertently jarred, the flexibility of the shaft 26 accommodates the loading thereby preventing damage to the fiber. The amount of shaft 26 flexibility will also depend on the material chosen. In one preferred embodiment, the shaft has a diameter which allows an operator to utilize a standard fiber optic termini removal and insertion tool for extracting and inserting the adapter 20 into the fiber optic connector 18.

Figure 1:
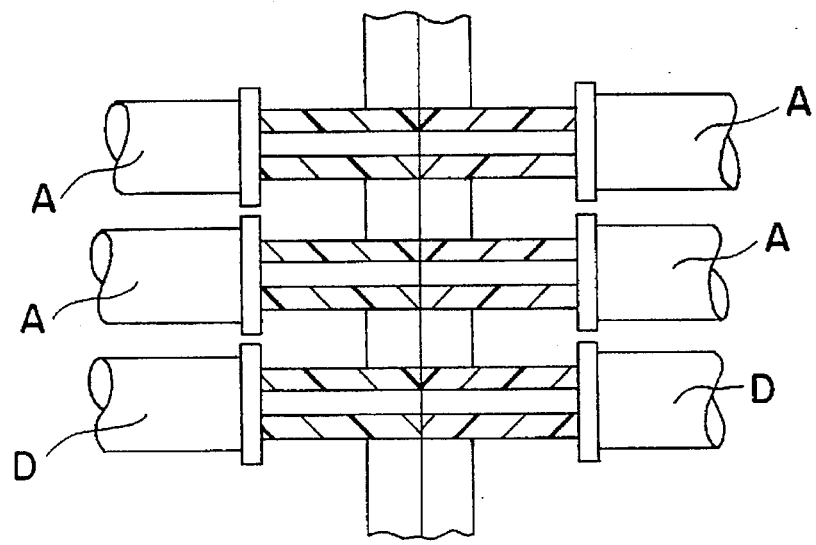
FIG. 1 illustrates a conventional connection between fiber optic cables with active and dummy fibers.
Figure 6:
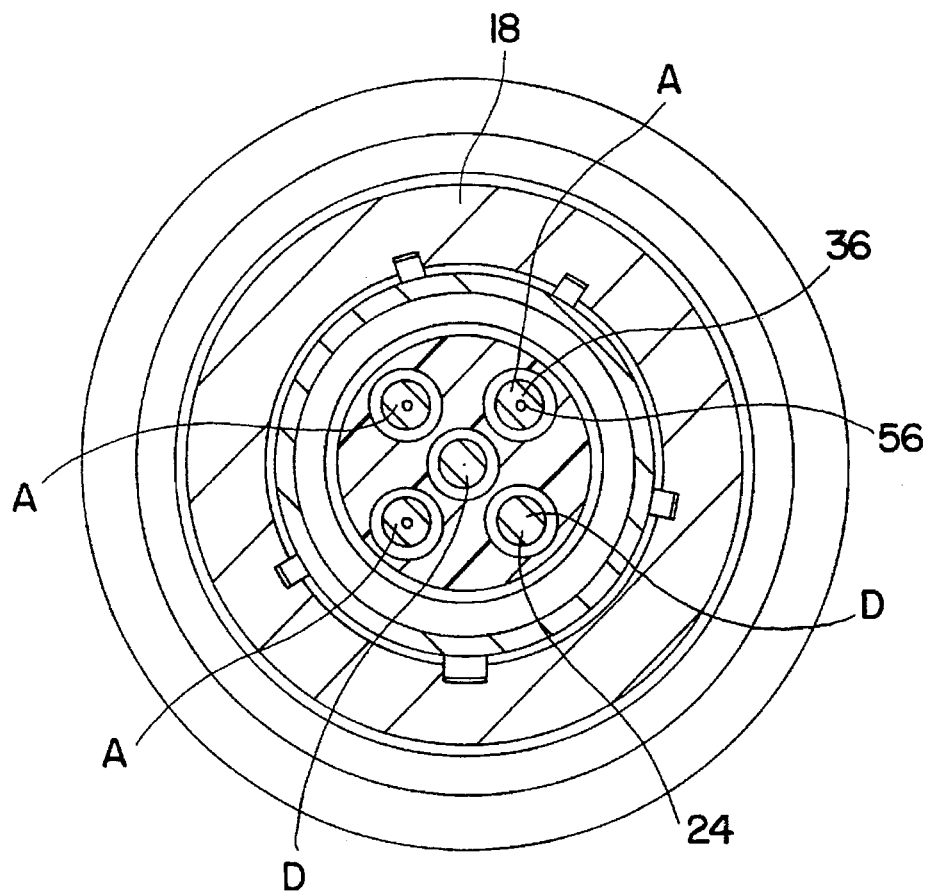
FIG. 6 is a sectional view of the fiber optic connector taken along lines 6—6 in FIG. 5 and illustrating multiple fibers and adapters.

FIG. 6 is a section view through the fiber optic connector 18 illustrating an arrangement of multiple fibers and fiber optic adapters 20. As discussed above, a typical fiber optic cable system 10 may comprise several active fibers and several dummy fibers. In the illustrated embodiment, the active fibers are designated 'A' and show a section through the ferrule 36 and optical fiber 56. The dummy fibers are designated 'D' and show a section through the plug extension 24.

In use, the active fibers are installed in the fiber optic connector in a conventional manner. The non-active fibers 12 are each inserted into a fiber optic adapter 20 until the shoulder portion 34 contacts the step 40. The cap 30 is then placed around the fiber 12 and attached to the housing 22 thereby retaining the shoulder portion 34 on the step 40. The adapter 20 is engaged with the fiber optic connector 18 by inserting the plug extension 24 into a passage formed in the connector until the plug extension shoulder 28 contacts the seat 52.

In order to activate a non-active fiber, the adapter 20 is extracted from the passage in the fiber optic connector 18. The cap 30 is unscrewed and the fiber 12 is removed. The fiber 12 is then directly inserted into the fiber optic connector 18 in an active passage.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

What is claimed is:

1. An adapter for connecting a terminus of an optical fiber to a fiber optic connector, the terminus including a plug member with a shoulder portion, the adapter comprising:

a housing;

a chamber formed in one end of the housing and having an opening adapted to receive the terminus of the fiber, the chamber being defined by a chamber wall adapted to envelop the terminus of the fiber when the fiber is received by the housing, the terminus of the fiber being spaced apart from at least the portion of the chamber wall opposite the opening;

a cap removably attachable to the housing, the cap having a channel formed therethrough for receiving a portion of the fiber, the cap adapted to retain the terminus within the chamber; and a plug extension extending from the housing, at least a portion of the plug extension adapted to be disposed within a passage in the connector; the plug extension adapted to space the fiber terminus apart from the connector.

2. A fiber optic adapter according to claim 1 wherein the housing further comprises a step formed around at least a portion of the periphery of the chamber, the step limiting the axial movement of the terminus into the chamber, and wherein the cap is adapted to press the shoulder portion of the terminus against the step when the fiber is engaged with the adapter.

3. A fiber optic adapter according to claim 1 wherein the cap is threadingly engaged to the housing.

4. A fiber optic adapter according to claim 1 wherein the channel in the cap extends to a lateral side of the cap for permitting the fiber to be slid into and out of the channel.

5. A fiber optic adapter according to claim 1 wherein the housing and plug extension are made from plastic material.

6. A fiber optic adapter according to claim 1 wherein the plug extension includes a shaft and a shoulder formed around at least a portion of the periphery of the shaft, the shoulder adapted to contact a seat formed within the passage in the fiber optic connector.

7. A fiber optic adapter according to claim 6 wherein the shaft is flexible.

8. A fiber optic adapter according to claim 6 wherein the shoulder has substantially the same diameter as the shoulder portion of the plug member.

9. A fiber optic adapter according to claim 1 wherein the plug extension is formed integral with the housing.

10. A fiber optic adapter according to claim 1 wherein the housing is substantially cylindrical in shape.

11. An adapter operative for engaging a terminus of a non-active fiber to a fiber optic connector, the adapter comprising:

a housing;

a chamber formed in one end of the housing and having an opening adapted to receive the terminus of the fiber, the chamber being defined by a chamber wall adapted to envelop the terminus of the fiber when the fiber is received by the housing, the terminus of the fiber being spaced apart from at least the portion of the chamber wall opposite the opening;

means for removably attaching the fiber to the housing so as to retain the terminus of the fiber within the chamber; and extension means formed on the housing and adapted to attach the housing to the fiber optic connector, the extension means operative for spacing the terminus of the fiber from the fiber optic connector.

12. A fiber optic adapter according to claim 11 wherein the extension means is a flexible extension of the housing.

13. A fiber optic adapter according to claim 11 wherein the means for removably attaching the fiber threadingly engages with the housing.

14. A fiber optic adapter according to claim 11 wherein the housing is substantially cylindrical in shape.

15. An adapter operative for engaging a terminus of a non-active fiber to a fiber optic connector, the adapter comprising:

a housing;

a chamber formed in one end of the housing and having an opening adapted to receive the terminus of the fiber, the chamber being defined by a chamber wall adapted to envelop the terminus of the fiber when the fiber is received by the housing, the terminus of the fiber being spaced apart from at least the portion of the chamber wall opposite the opening;

an attachment mechanism for attaching the fiber to the housing so as to retain the terminus of the fiber within the chamber; and an extension formed on the housing and adapted to attach the housing to the fiber optic connector, the extension spacing the terminus of the fiber from the fiber optic connector when the adapter is engaged to the connector.

16. A fiber optic adapter according to claim 15 wherein the attachment mechanism is a spring retention clip which engages with the terminus of the fiber.

17. A fiber optic adapter according to claim 15 wherein the attachment mechanism is a retention flange within the housing which inhibits axial removal of the terminus from the chamber when the fiber is attached to the housing.

18. A method of using an adapter to connect the terminus of a non-active optical fiber to a fiber optic connector such that the terminus of the non-active fiber is separated from contact with the fiber optic connector, comprising the steps of:

placing the terminus of the non-active fiber within a chamber in an adapter housing;

locking the terminus into the chamber so as to prevent axial translation of the terminus within the chamber, the terminus being spaced from walls of the chamber; and inserting a plug extension of the adapter housing into the passage in the fiber optic connector until a shoulder on the plug extension contacts a seat, the chamber of the housing being spaced from the fiber optic connector when the shoulder of the plug extension contacts the seat.

* * * * *